US007643700B2

(12) United States Patent
Kodama

(10) Patent No.: US 7,643,700 B2
(45) Date of Patent: Jan. 5, 2010

(54) PROCESSING OF CODED DATA ACCORDING TO USER PREFERENCE

(75) Inventor: Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 894 days.

(21) Appl. No.: 10/928,364

(22) Filed: Aug. 27, 2004

(65) Prior Publication Data

US 2005/0074172 A1 Apr. 7, 2005

(30) Foreign Application Priority Data

Aug. 29, 2003 (JP) ............................ 2003-307553

(51) Int. Cl.
*G06K 9/20* (2006.01)
*G06K 9/36* (2006.01)

(52) U.S. Cl. ..................................................... 382/282

(58) Field of Classification Search ................. 382/162, 382/240, 282, 298; 709/203
See application file for complete search history.

(56) References Cited

U.S. PATENT DOCUMENTS

| | | | | |
|---|---|---|---|---|
| 7,024,046 | B2 * | 4/2006 | Dekel et al. | 382/240 |
| 2003/0067627 | A1 * | 4/2003 | Ishikawa et al. | 358/1.15 |

FOREIGN PATENT DOCUMENTS

| | | |
|---|---|---|
| JP | 09-065234 | 9/1998 |
| JP | 2002-039612 | 11/2002 |

* cited by examiner

*Primary Examiner*—Phuoc Tran
(74) *Attorney, Agent, or Firm*—Blakely, Sokoloff, Taylor & Zafman LLP

(57) ABSTRACT

An image processing apparatus for processing coded data of still images or moving pictures includes a code selection controlling unit to select, from the coded data, codes that match classifications provided in a code selecting list, in which the classifications are arranged according to at least one of resolution, image quality, color component, position, and a region of interest, and a processing unit to process the codes selected by the code selection controlling unit.

16 Claims, 16 Drawing Sheets

FIG.4

| CLASSIFICATION 0 | CLASSIFICATION 1 | CLASSIFICATION 2 | CLASSIFICATION 3 | CLASSIFICATION 4 | CLASSIFICATION 5 |
|---|---|---|---|---|---|
| LAYER 0 | LAYER 0 | LAYER 0 | LAYER 0 | LAYER 0 | LAYER 0 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| CLASSIFICATION 6 | CLASSIFICATION 7 | CLASSIFICATION 8 | CLASSIFICATION 9 | CLASSIFICATION 10 | CLASSIFICATION 11 |
|---|---|---|---|---|---|
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| CLASSIFICATION 12 | CLASSIFICATION 13 | CLASSIFICATION 14 | CLASSIFICATION 15 | CLASSIFICATION 16 | CLASSIFICATION 17 |
|---|---|---|---|---|---|
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| CLASSIFICATION 18 | CLASSIFICATION 19 | CLASSIFICATION 20 | CLASSIFICATION 21 | CLASSIFICATION 22 | CLASSIFICATION 23 |
|---|---|---|---|---|---|
| LAYER 1 | LAYER 1 | LAYER 1 | LAYER 1 | LAYER 1 | LAYER 1 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| CLASSIFICATION 24 | CLASSIFICATION 25 | CLASSIFICATION 26 | CLASSIFICATION 27 | CLASSIFICATION 28 | CLASSIFICATION 29 |
|---|---|---|---|---|---|
| LAYER 1 | LAYER 1 | LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| CLASSIFICATION 30 | CLASSIFICATION 31 | CLASSIFICATION 32 | CLASSIFICATION 33 | CLASSIFICATION 34 | CLASSIFICATION 35 |
|---|---|---|---|---|---|
| LAYER 1 | LAYER 1 | LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

FIG.5

| | | | | | |
|---|---|---|---|---|---|
| CLASSIFICATION 0 | CLASSIFICATION 1 | CLASSIFICATION 2 | CLASSIFICATION 3 | CLASSIFICATION 4 | CLASSIFICATION 5 |
| LAYER 0 | LAYER 0 | LAYER 0 | LAYER 0 | LAYER 0 | LAYER 0 |
| RESOLUTION LEVEL 0 | RESOLUTION LEVEL 1 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 0 | COMPONENT 0 |
| PRECINCT 0 | PRECINCT 0 | PRECINCT 0 | PRECINCT 1 | PRECINCT 2 | PRECINCT 3 |

| | | | | | |
|---|---|---|---|---|---|
| CLASSIFICATION 6 | CLASSIFICATION 7 | CLASSIFICATION 8 | CLASSIFICATION 9 | CLASSIFICATION 10 | CLASSIFICATION 11 |
| LAYER 1 | LAYER 1 | LAYER 1 | LAYER 1 | LAYER 1 | LAYER 1 |
| RESOLUTION LEVEL 0 | RESOLUTION LEVEL 1 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 0 | COMPONENT 0 |
| PRECINCT 0 | PRECINCT 0 | PRECINCT 0 | PRECINCT 1 | PRECINCT 2 | PRECINCT 3 |

| | | | | | |
|---|---|---|---|---|---|
| CLASSIFICATION 12 | CLASSIFICATION 13 | CLASSIFICATION 14 | CLASSIFICATION 15 | CLASSIFICATION 16 | CLASSIFICATION 17 |
| LAYER 0 | LAYER 0 | LAYER 0 | LAYER 0 | LAYER 0 | LAYER 0 |
| RESOLUTION LEVEL 0 | RESOLUTION LEVEL 1 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 1 | COMPONENT 1 | COMPONENT 1 | COMPONENT 1 |
| PRECINCT 0 | PRECINCT 0 | PRECINCT 0 | PRECINCT 1 | PRECINCT 2 | PRECINCT 3 |

| | | | | | |
|---|---|---|---|---|---|
| CLASSIFICATION 18 | CLASSIFICATION 19 | CLASSIFICATION 20 | CLASSIFICATION 21 | CLASSIFICATION 22 | CLASSIFICATION 23 |
| LAYER 1 | LAYER 1 | LAYER 1 | LAYER 1 | LAYER 1 | LAYER 1 |
| RESOLUTION LEVEL 0 | RESOLUTION LEVEL 1 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 1 | COMPONENT 1 | COMPONENT 1 | COMPONENT 1 |
| PRECINCT 0 | PRECINCT 0 | PRECINCT 0 | PRECINCT 1 | PRECINCT 2 | PRECINCT 3 |

| | | | | | |
|---|---|---|---|---|---|
| CLASSIFICATION 24 | CLASSIFICATION 25 | CLASSIFICATION 26 | CLASSIFICATION 27 | CLASSIFICATION 28 | CLASSIFICATION 29 |
| LAYER 0 | LAYER 0 | LAYER 0 | LAYER 0 | LAYER 0 | LAYER 0 |
| RESOLUTION LEVEL 0 | RESOLUTION LEVEL 1 | RESOLUTION LEVEL 2 | RESOLUTION LEVEL 2 | RESOLUTION LEVEL 2 | RESOLUTION LEVEL 2 |
| COMPONENT 2 | COMPONENT 2 | COMPONENT 2 | COMPONENT 2 | COMPONENT 2 | COMPONENT 2 |
| PRECINCT 0 | PRECINCT 0 | PRECINCT 0 | PRECINCT 1 | PRECINCT 2 | PRECINCT 3 |

| | | | | | |
|---|---|---|---|---|---|
| CLASSIFICATION 30 | CLASSIFICATION 31 | CLASSIFICATION 32 | CLASSIFICATION 33 | CLASSIFICATION 34 | CLASSIFICATION 35 |
| LAYER 1 | LAYER 1 | LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 2 | COMPONENT 2 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

FIG.6

| | | | | | |
|---|---|---|---|---|---|
| CLASSIFICATION 0 | CLASSIFICATION 1 | CLASSIFICATION 2 | CLASSIFICATION 3 | CLASSIFICATION 4 | CLASSIFICATION 5 |
| LAYER 0 | LAYER 0 | LAYER 0 | LAYER 0 | LAYER 0 | LAYER 0 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| | | | | | |
|---|---|---|---|---|---|
| CLASSIFICATION 6 | CLASSIFICATION 7 | CLASSIFICATION 8 | CLASSIFICATION 9 | CLASSIFICATION 10 | CLASSIFICATION 11 |
| LAYER 1 | LAYER 1 | LAYER 1 | LAYER 1 | LAYER 1 | LAYER 1 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| | | | | | |
|---|---|---|---|---|---|
| CLASSIFICATION 12 | CLASSIFICATION 13 | CLASSIFICATION 14 | CLASSIFICATION 15 | CLASSIFICATION 16 | CLASSIFICATION 17 |
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| | | | | | |
|---|---|---|---|---|---|
| CLASSIFICATION 18 | CLASSIFICATION 19 | CLASSIFICATION 20 | CLASSIFICATION 21 | CLASSIFICATION 22 | CLASSIFICATION 23 |
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| | | | | | |
|---|---|---|---|---|---|
| CLASSIFICATION 24 | CLASSIFICATION 25 | CLASSIFICATION 26 | CLASSIFICATION 27 | CLASSIFICATION 28 | CLASSIFICATION 29 |
| LAYER 1 | LAYER 1 | LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| | | | | | |
|---|---|---|---|---|---|
| CLASSIFICATION 30 | CLASSIFICATION 31 | CLASSIFICATION 32 | CLASSIFICATION 33 | CLASSIFICATION 34 | CLASSIFICATION 35 |
| LAYER 1 | LAYER 1 | LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

FIG.7

| | | | | | |
|---|---|---|---|---|---|
| CLASSIFICATION 0 | CLASSIFICATION 1 | CLASSIFICATION 2 | CLASSIFICATION 3 | CLASSIFICATION 4 | CLASSIFICATION 5 |
| LAYER 0 | LAYER 0 | LAYER 0 | LAYER 0 | LAYER 0 | LAYER 0 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| | | | | | |
|---|---|---|---|---|---|
| CLASSIFICATION 6 | CLASSIFICATION 7 | CLASSIFICATION 8 | CLASSIFICATION 9 | CLASSIFICATION 10 | CLASSIFICATION 11 |
| LAYER 1 | LAYER 1 | LAYER 1 | LAYER 1 | LAYER 1 | LAYER 1 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| | | | | | |
|---|---|---|---|---|---|
| CLASSIFICATION 12 | CLASSIFICATION 13 | CLASSIFICATION 14 | CLASSIFICATION 15 | CLASSIFICATION 16 | CLASSIFICATION 17 |
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| | | | | | |
|---|---|---|---|---|---|
| CLASSIFICATION 18 | CLASSIFICATION 19 | CLASSIFICATION 20 | CLASSIFICATION 21 | CLASSIFICATION 22 | CLASSIFICATION 23 |
| LAYER 0 | LAYER 0 | LAYER 0 | LAYER 0 | LAYER 0 | LAYER 0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| | | | |
|---|---|---|---|
| CLASSIFICATION 24 | CLASSIFICATION 25 | CLASSIFICATION 26 | CLASSIFICATION 27 |
| LAYER 1 | LAYER 1 | LAYER 1 | LAYER 1 |
| RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 |
| PRECINCT 0 | PRECINCT 1 | PRECINCT 2 | PRECINCT 3 |

DECOMPOSITION_LEVEL_0

DECOMPOSITION_LEVEL_1

DECOMPOSITION_LEVEL_2

DECOMPOSITION_LEVEL_3

FIG.17

| SUB-BAND | PRECINCT NO. | | | | | | | | | | | |
|---|---|---|---|---|---|---|---|---|---|---|---|---|
| 2LL | 0 | 0 | | | | 17 | 34 | 51 | 68 | 85 | 102 | 119 |
| 2LL | 1 | 1 | | | | 18 | 35 | 52 | 69 | 86 | 103 | 120 |
| 2LL | 2 | 2 | | | | 19 | 36 | 53 | 70 | 87 | 104 | 121 |
| 2LL | 3 | 3 | | | | 20 | 37 | 54 | 71 | 88 | 105 | 122 |
| 2HL | 0 | 4 | | | 21 | 38 | 55 | 72 | 89 | 106 | 123 | 136 |
| 2HL | 1 | 5 | | | 22 | 39 | 56 | 73 | 90 | 107 | 124 | 137 |
| 2HL | 2 | 6 | | | 23 | 40 | 57 | 74 | 91 | 108 | 125 | 138 |
| 2HL | 3 | 7 | | | 24 | 41 | 58 | 75 | 92 PACKET | 109 | 126 | 139 |
| 2LH | 0 | 4 | | | 21 | 38 | 55 | 72 | 89 | 106 | 123 | 136 |
| 2LH | 1 | 5 | | | 22 | 39 | 56 | 73 | 90 | 107 | 124 | 137 |
| 2LH | 2 | 6 | | | 23 | 40 | 57 | 74 | 91 | 108 | 125 | 138 |
| 2LH | 3 | 7 | | | 24 | 41 | 58 | 75 | 92 | 109 | 126 | 139 |
| 2HH | 0 | 4 | | 21 | 38 | 55 | 72 | 89 | 106 | 123 | 136 | 149 |
| 2HH | 1 | 5 | | 22 | 39 | 56 | 73 | 90 | 107 | 124 | 137 | 150 |
| 2HH | 2 | 6 | | 23 | 40 | 57 | 74 | 91 | 108 | 125 | 138 | 151 |
| 2HH | 3 | 7 | | 24 | 41 | 58 | 75 | 92 | 109 | 126 | 139 | 152 |
| 1HL | 0 | 8 | 25 | 42 | 59 | 76 | 93 | 110 | 127 | 140 | 153 | |
| 1HL | 1 | 9 | 26 | 43 | 60 | 77 | 94 | 111 | 128 | 141 | 154 | |
| 1HL | 2 | 10 | 27 | 44 | 61 | 78 | 95 | 112 | 129 | 142 | 155 | |
| 1HL | 3 | 11 | 28 | 45 | 62 | 79 | 96 | 113 | 130 | 143 | 156 | |
| 1HL | 4 | 12 | 29 | 46 | 63 | 80 | 97 | 114 | 131 | 144 | 157 | |
| 1HL | 5 | 13 | 30 | 47 | 64 | 81 | 98 | 115 | 132 | 145 | 158 | |
| 1HL | 6 | 14 | 31 | 48 | 65 | 82 | 99 | 116 | 133 | 146 | 159 | |
| 1HL | 7 | 15 | 32 | 49 | 66 | 83 | 100 | 117 | 134 | 147 | 160 | |
| 1HL | 8 | 16 | 33 | 50 | 67 | 84 | 101 | 118 | 135 | 148 | 161 | |
| 1LH | 0 | 8 | 25 | 42 | 59 | 76 | 93 | 110 | 127 | 140 | 153 | |
| 1LH | 1 | 9 | 26 | 43 | 60 | 77 | 94 | 111 | 128 | 141 | 154 | |
| 1LH | 2 | 10 | 27 | 44 | 61 | 78 | 95 | 112 | 129 | 142 | 155 | |
| 1LH | 3 | 11 | 28 | 45 | 62 | 79 | 96 | 113 | 130 | 143 | 156 | |
| 1LH | 4 | 12 | 29 | 46 | 63 | 80 | 97 | 114 | 131 | 144 | 157 | |
| 1LH | 5 | 13 | 30 | 47 | 64 | 81 | 98 | 115 | 132 | 145 | 158 | |
| 1LH | 6 | 14 | 31 | 48 | 65 | 82 | 99 | 116 | 133 | 146 | 159 | |
| 1LH | 7 | 15 | 32 | 49 | 66 | 83 | 100 | 117 | 134 | 147 | 160 | |
| 1LH | 8 | 16 | 33 | 50 | 67 | 84 | 101 | 118 | 135 | 148 | 161 | |
| 1HH | 0 | 8 | 25 | 42 | 59 | 76 | 93 | 110 | 127 | 140 | 153 | |
| 1HH | 1 | 9 | 26 | 43 | 60 | 77 | 94 | 111 | 128 | 141 | 154 | |
| 1HH | 2 | 10 | 27 | 44 | 61 | 78 | 95 | 112 | 129 | 142 | 155 | |
| 1HH | 3 | 11 | 28 | 45 | 62 | 79 | 96 | 113 | 130 | 143 | 156 | |
| 1HH | 4 | 12 | 29 | 46 | 63 | 80 | 97 | 114 | 131 | 144 | 157 | |
| 1HH | 5 | 13 | 30 | 47 | 64 | 81 | 98 | 115 | 132 | 145 | 158 | |
| 1HH | 6 | 14 | 31 | 48 | 65 | 82 | 99 | 116 | 133 | 146 | 159 | |
| 1HH | 7 | 15 | 32 | 49 | 66 | 83 | 100 | 117 | 134 | 147 | 160 | |
| 1HH | 8 | 16 | 33 | 50 | 67 | 84 | 101 | 118 | 135 | 148 | 161 | |

BIT PLANE / SUB-BIT PLANE:

MSB
CODE OF BIT POSITION 12: Cleanup
CODE OF BIT POSITION 11: Significant, Refinement, Cleanup
CODE OF BIT POSITION 10: Significant, Refinement, Cleanup
CODE OF BIT POSITION 9: Significant, Refinement, Cleanup
CODE OF BIT POSITION 8: Significant, Refinement, Cleanup
CODE OF BIT POSITION 7: Significant, Refinement, Cleanup
CODE OF BIT POSITION 6: Significant, Refinement, Cleanup
CODE OF BIT POSITION 5: Significant, Refinement, Cleanup
CODE OF BIT POSITION 4: Significant, Refinement, Cleanup
CODE OF BIT POSITION 3: Significant, Refinement, Cleanup
CODE OF BIT POSITION 2: Significant, Refinement, Cleanup
CODE OF BIT POSITION 1: Significant, Refinement, Cleanup
LSB

PROCESSING OF CODED DATA ACCORDING TO USER PREFERENCE

The present application claims priority to the corresponding Japanese Patent Application No. 2003-307553, filed on Aug. 29, 2003, the entire contents of which are hereby incorporated by reference.

BACKGROUND OF THE INVENTION

1. Field of the Invention

The present invention generally relates to the processing of image coded data, and particularly relates to an apparatus and method for the decoding or code conversion of coded data with respect to still images or moving pictures.

2. Description of the Related Art

In an apparatus for decoding coded data of moving pictures, the decoding of each frame may not be completed within a predetermined time period. In such a case, the subsequent decoding process may be switched to a simplified version as disclosed in Japanese Patent Application Publication No. 2002-325257 (hereinafter, Patent Document 1). To be specific, the coded data of each frame coded by JPEG2000, which is a new international standard coding method, is subjected to decoding that starts from sub-band coefficients corresponding to lower frequencies. While this decoding process is in progress, a time lapse is monitored on a component-by-component basis or on a tile-by-tile basis. If the time lapse reaches a time limit, simplification is performed with respect to the decoding of the current component or tile.

In systems where a transmission apparatus transmits coded data of moving pictures to a reception apparatus via a network, and the reception apparatus decodes the coded data of moving pictures, there may be a need to cope with network congestion. To this end, the transmission apparatus may transmit codes of each frame in a descending order of priority in terms of image quality, and may dispose of the codes that cannot be transmitted within a frame time, as disclosed in Japanese Patent Application Publication No. 10-262245 (hereinafter, Patent Document 2). To be specific, a DCT (discrete cosine transform) is performed on a block-specific basis where one block is comprised of 8 pixels by 8 pixels. The DCT coefficients of each block are divided into a low frequency band, a middle frequency band, and a high frequency band for hierarchical coding that is independent for each frequency band. Codes of the lowest frequency band are picked up first for transmission. If no time is left, codes of higher frequency bands are disposed of.

The technology disclosed in Patent Document 1 can prevent frames from being dropped. Since the codes to be decoded and the codes to be simplified cannot be controlled through user choice, the user may not always be able to obtain reproduced images having the appearance that the user wishes.

In moving pictures of Motion-JPEG2000 in which each frame is coded according to JPEG2000, packets that constitute coded data of each frame have indexes indicative of resolution, color components, position, and image quality. In accordance with combinations of these indexes, packets can be sequenced in various orders (progression orders). Namely, in the coded data of each frame, codes are not always arranged such that the codes of lower frequencies come first as in Patent Document 1. Preference for the quality of reproduced images may differ from user to user, some attaching importance to resolution, some attaching importance to image quality, some attaching importance to color reproduction, etc. Further, the display size of images may vary. As a result, the method that decodes codes of each frame successively and switches to simplified processing after the passage of a time limit may not reproduce images having the appearance intended by the user.

The technology disclosed in Patent Document 1 may be applied to a case in which there is a need to reproduce still images of JPEG2000 or the like within a predetermined time period with sufficient real-time property. Even in this case, however, reproduced images may not always have the appearance intended by the user, which is the same as in the case of moving pictures.

The technology disclosed in Patent Document 2 serves to control the amount of codes to be transmitted by taking into account the conditions of the network, and does not guarantee that the dropping of frames is prevented in the reception apparatus (image display apparatus). Since reception apparatuses have respective decoding capabilities, the dropping of frames may occur when the decoding capability becomes insufficient or the processing load increases in a reception apparatus. Further, the user preference may not be reflected in terms of image quality, resolution, color components, etc.

If the transmission apparatus controls the amount of codes to be transmitted according to the decoding capabilities of respective reception apparatuses, it may be possible to prevent the dropping of frames. When moving pictures are distributed from the transmission apparatus to a large number of reception apparatuses, however, the load on the network increases as the data having different code amounts are redundantly transmitted with respect to the same moving pictures. It is impractical to transmit coded data in such a fashion as to reflect the needs of users of respective reception apparatuses, and, thus, it is difficult to attain image reproduction that provides the appearance intended by the user. Accordingly, it is desired to control the decoding process on a reception side, by taking into account the decoding capability, user preference, etc, rather than to control the amount of codes on a transmission side.

Accordingly, there is a need for an image processing apparatus, an image processing system, and an image processing method that can provide image reproduction properly reflecting the decoding capability, user preference, etc., with respect to coded moving pictures or coded still images.

SUMMARY OF THE INVENTION

A method, system, and apparatus for processing coded data according to a user preference is disclosed. In one embodiment, the apparatus comprises a code selection controlling unit to select, from the coded data, codes that match classifications provided in a code selecting list, in which the classifications are arranged according to at least one of resolution, image quality, color component, position, and a region of interest, and a processing unit to process the codes selected by the code selection controlling unit.

BRIEF DESCRIPTION OF THE DRAWINGS

Other objects and further features of the present invention will be apparent from the following detailed description when read in conjunction with the accompanying drawings, in which:

FIG. 4 is an illustrative drawing showing an example of a code selecting list;

FIG. 5 is an illustrative drawing showing another example of a code selecting list;

FIG. 6 is an illustrative drawing showing yet another example of a code selecting list;

FIG. 7 is an illustrative drawing showing still another example of a code selecting list;

FIG. 17 is an illustrative drawing showing an example of packets and layers in a case where tile division is not performed, with the number of comports being 1 and the number of decomposition levels being 2 (the level of resolution being 3).

DESCRIPTION OF THE PREFERRED EMBODIMENTS

Figure 1:
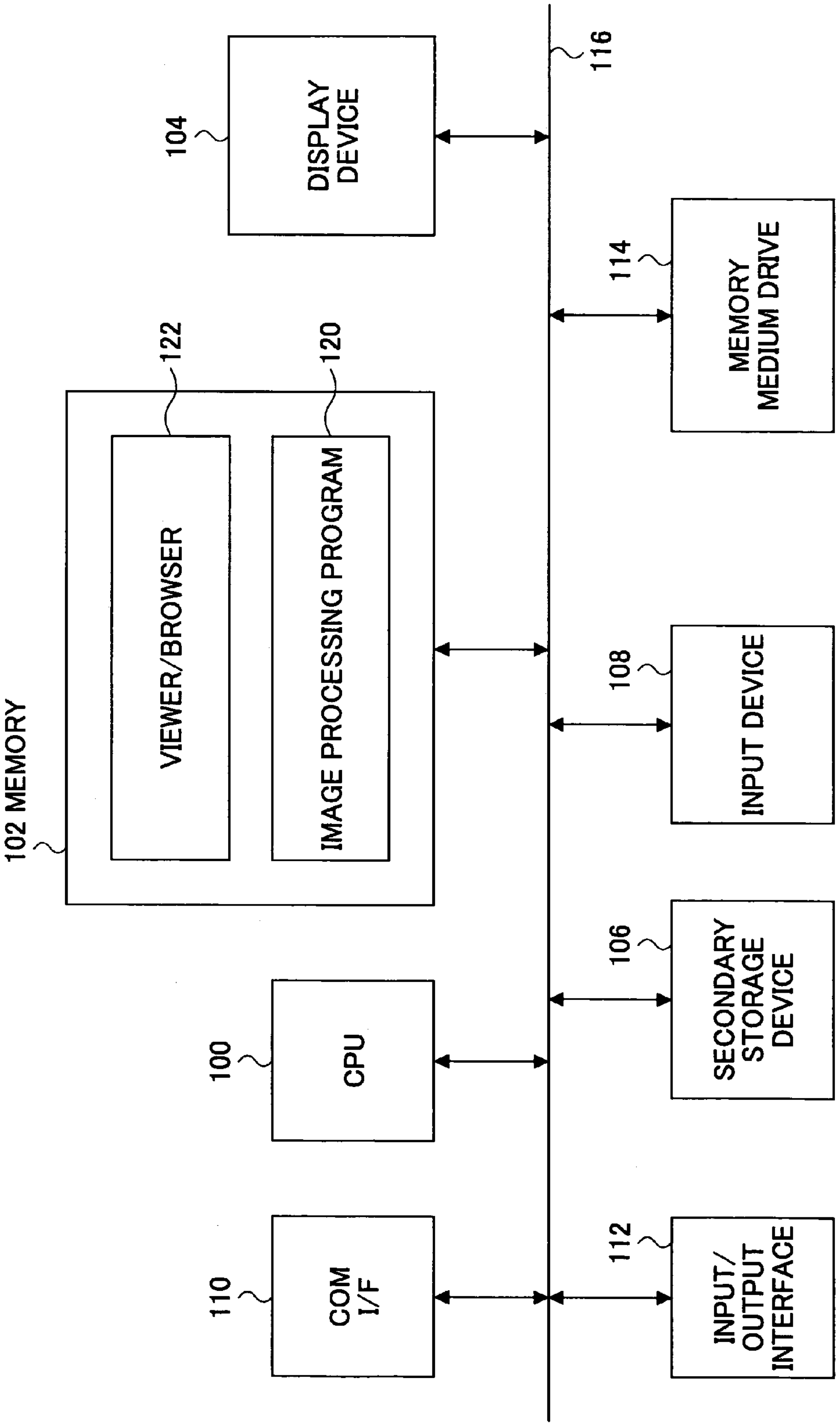
FIG. 1 is a block diagram showing the construction of a computer.

Embodiments of the present invention include an image processing apparatus, an image processing system, and an image processing method that substantially obviate one or more problems caused by the limitations and disadvantages of the related art.

Features and advantages of the present invention will be presented in the description, which follows, and in part will become apparent from the description and the accompanying drawings, or may be learned by practice of the invention according to the teachings provided in the description. Features and advantages of the present invention will be realized and attained by an image processing apparatus, an image processing system, and an image processing method particularly pointed out in the specification in such full, clear, concise, and exact terms as to enable a person having ordinary skill in the art to practice the invention.

To achieve these and other advantages in accordance with the purpose of the invention, one embodiment of the invention includes an image processing apparatus for processing coded data of still images or moving pictures, that includes a code selection controlling unit to select, from the coded data, codes that match classifications provided in a code selecting list, in which the classifications are arranged according to at least one of resolution, image quality, color component, position, and a region of interest, and a processing unit to process the codes selected by the code selection controlling unit.

According to the image processing apparatus as described above, decoding or code conversion is performed with respect to the coded data of still images or moving pictures by controlling the selection of codes according to classifications by resolution, image quality, color components, position, a region of interest, etc. For example, the control of code selection is achieved by using various parameters such as a resolution level and decomposition level for resolution, a layer, bit-plane, sub-bit-plane, and frequency component for image quality, a tile, precinct, and code block for position, a component for color components, a ROI are for a region of interest. This makes it possible to achieve proper reproduction of still images or moving pictures that takes into account priority in respect of resolution, image quality, color component, position, and a region of interest.

According to at least one embodiment of the invention, the code selecting list includes the classifications arranged in the order in which the codes are to be selected, and the code selection controlling unit selects the codes in the order. This provides for the order of code selection to be properly controlled in response to priority or the like that is given to resolution, image quality, color component, position, a region of interest, etc. If the order of code selection is aligned to the order in which codes are arranged in original coded data, coded data obtained after code conversion can also be subjected to the scheduled progressive reproduction.

According to at least one embodiment of the invention, the code selection controlling unit generates the code selecting list separately for each still image or for each moving-picture frame. This achieves the selection of codes that adaptively responds to the amount of codes in each still image or each moving-picture frame and to differences in the data structure or the like.

According to at least one embodiment of the invention, the code selection controlling unit includes a unit to modify the code selecting list in response to progress of processing. This achieves the flexible control of code selection that adaptively responds to the progress of processing.

According to at least one embodiment of the invention, the code selection controlling unit stops selecting the codes in response to an end request. This makes it possible to stop the selection of codes at once as such a need arises, and a decoding or code conversion process is performed with respect to the codes that have been selected so far.

According to at least one embodiment of the invention, the code selection controlling unit includes a unit to receive conditions regarding at least one of resolution, image quality, color component, position, a region of interest, a frame rate, an amount of codes to be selected, and a processing time, to set a parameter to at least one of resolution, image quality, color component, position, a region of interest in response to the received conditions, and to generate the code selecting list responsive to the parameter. With this provision, the selection of codes can reflect conditions regarding resolution, image quality, color component, position, a region of interest, a frame rate, an amount of codes to be selected, and a processing time.

According to the present invention, an image processing system and an image processing method are also provided, corresponding to the image processing apparatus as described above.

The embodiments described in the following are directed to still image coded data according to JPEG2000 or moving picture coded data according to Motion-JPEG2000. Each frame of moving pictures according to Motion-JPEG2000 is coded by use of JPEG2000. In consideration of this, the outline of JPEG2000 will be described as far as it is relevant to the description of the invention.

Figure 12:
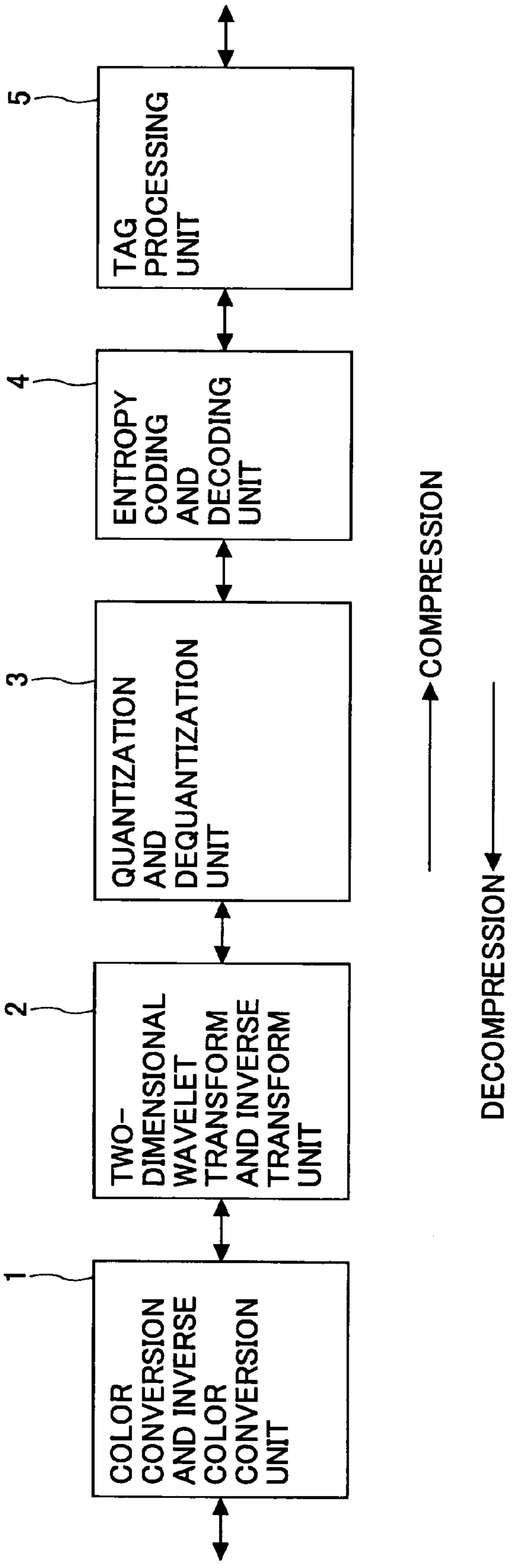
FIG. 12 is a block diagram for illustrating a JPEG2000 algorithm.

FIG. 12 is a block diagram for explaining a JPEG2000 algorithm. FIG. 12 illustrates a color conversion and inverse color conversion unit 1, a two-dimensional wavelet transform and inverse transform unit 2, a quantization and dequantization unit 3, an entropy coding and decoding unit 4, and a tag processing unit 5.

At the time of coding (compression), each component of an original image is divided into non-overlapping rectangular areas that are called tiles. Data of each tile of each component are input into the color conversion and inverse color conversion unit 1.

Figure 13:
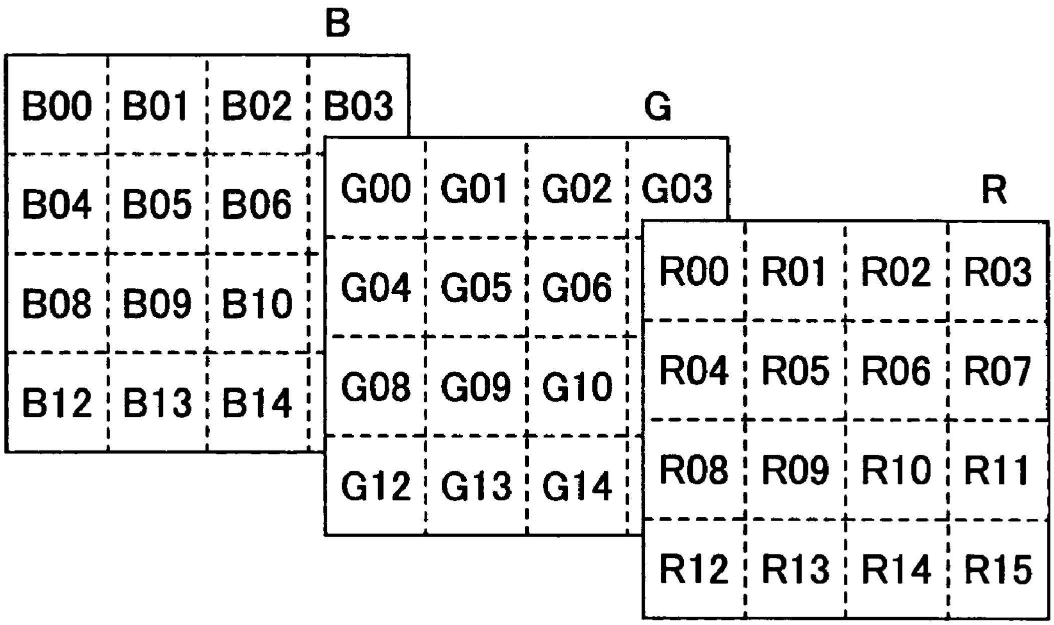
FIG. 13 is an illustrative drawing showing an example of tile division.
Figure 14A:
FIGS. 14A through 14D are drawings showing sub-bands in each decomposition level in a case where the number of decomposition levels is 3.
Figure 14B:
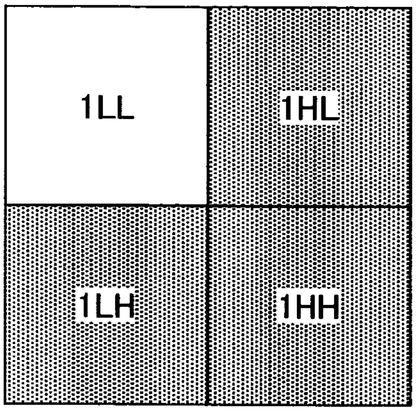
Figure 14C:
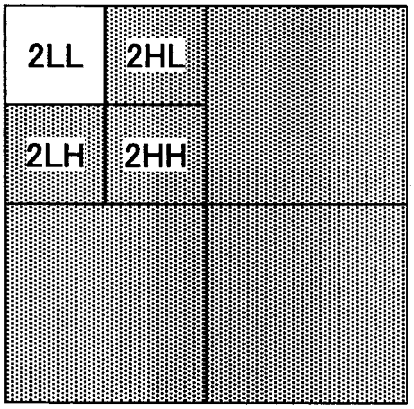
Figure 14D:
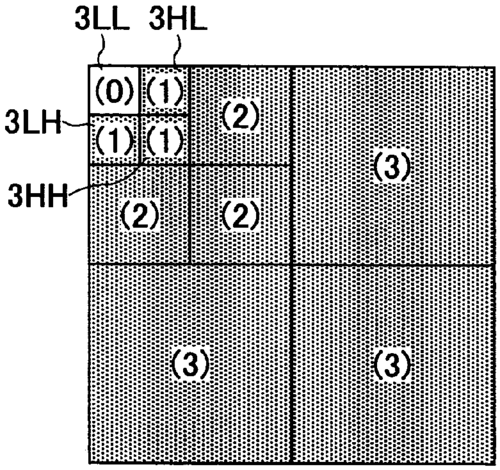

FIG. 13 is an illustrative drawing showing an example of tile division. In this example, each of the components R, G, and B of an original image is divided into 16 tiles. Each tile of each component corresponds to the unit of processing for compression/decompression. Each tile of each component is converted into a YCrCb or YUV color system by the color conversion and inverse color conversion unit 1. The two-dimensional wavelet transform and inverse transform unit 2 then carries out the wavelet transform (direct transform), thereby achieving the division of space into frequency bands (sub-bands).

FIGS. 14A through 14D are drawings showing sub-bands in each decomposition level in the case where the number of decomposition levels is 3. A tile image (0LL) (decomposition level 0) that is obtained by the tile division of an original image is subjected to the 2-dimensional wavelet transform, thereby providing sub-bands (1LL, 1HL, 1LH, 1HH) shown at the decomposition level 1. Following this, low frequency components at this hierarchical level, i.e., the coefficients of the 1LL sub-band, are subjected to the 2-dimensional wavelet transform, thereby providing sub-bands (2LL, 2HL, 2LH, 2HH) shown at the decomposition level 2. Subsequently, the 2-dimensional wavelet transform is again performed with respect to low frequency components at this hierarchical level, i.e., with respect to the coefficients of the 2LL sub-band, thereby producing sub-bands (3LL, 3HL, 3LH, 3HH) shown at the decomposition level 3. Each sub-band at the decomposition level 3 is provided with a number enclosed in parentheses, the number indicating the level of resolution.

The coefficients of each sub-band are linear-quantized by the quantization and dequantization unit 3 according to need, and are then subjected to entropy decoding by the entropy coding and decoding unit 4. In JPEG2000, the coefficients of each sub-band are divided into bit-planes, and each sub-band is divided into non-overlapping rectangular areas called precincts. Each precinct is divided into non-overlapping rectangular areas called code blocks. The coefficients of each sub-band are encoded on a code-block-by-code-block basis from the higher-order bit-planes to the lower-order bit-planes (more precisely, each bit-plane is divided into three sub-bit-planes for coding). In this entropy coding, bits to be encoded are selected in the specified coding order, and the quantization and dequantization unit 3 generates contexts from the surrounding bits of a bit of interest. Arithmetic coding is performed based on the contexts and the probability estimation of the bit of interest.

Figure 15:
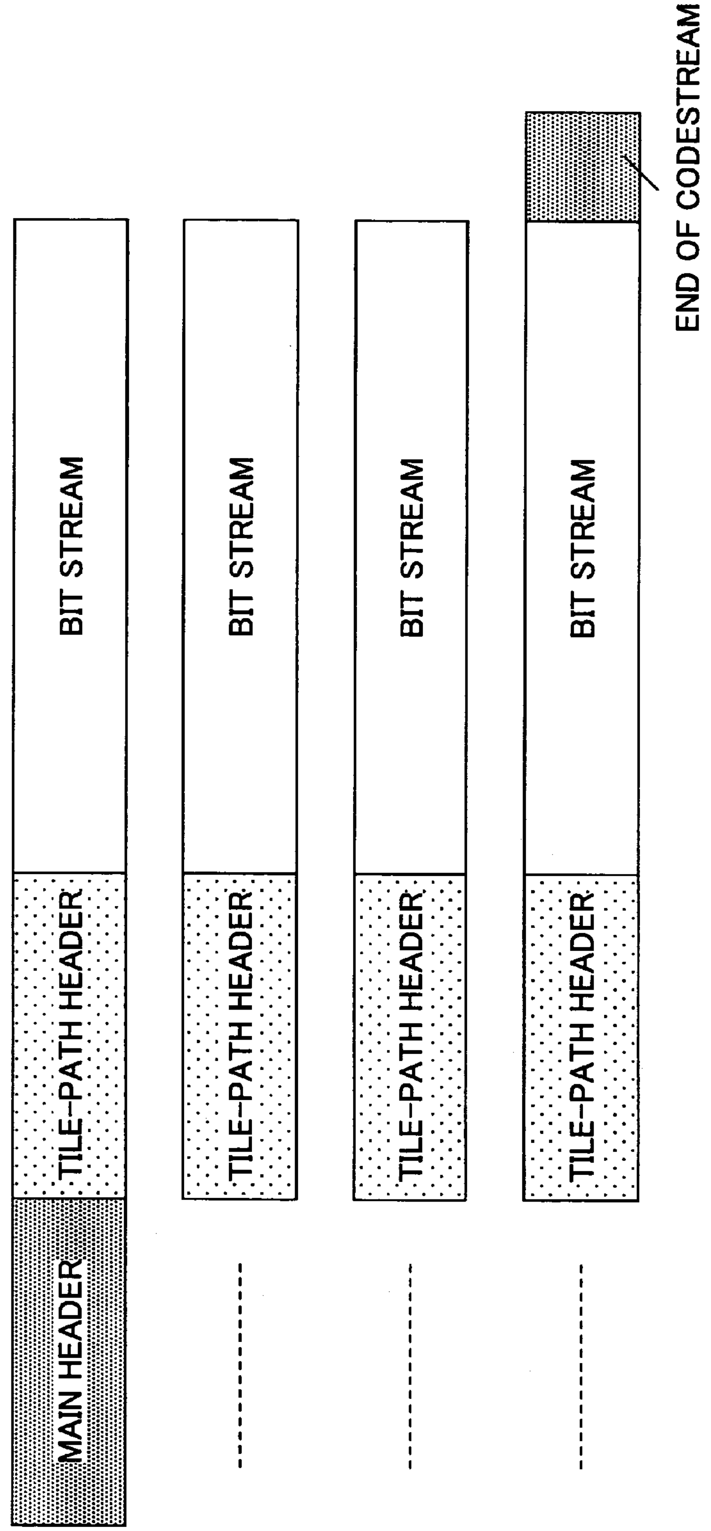
FIG. 15 is an illustrative drawing showing the format of a code stream.

The tag processing unit 5 serves to perform a code generating process. The tag processing unit 5 generates packets by combining entropy codes, arranging the packets in the progression order, and attaching necessary tags and tag information, thereby generating a code stream (coded data) having a format as shown in FIG. 15. The beginning of the code stream and the beginning of each tile part are provided with tag information called a main header and a tile-part header, respectively, followed by codes of each tile (bit stream). At the end of the code stream, an end tag (End of codestream) is provided.

The precinct, code block, packet, and layer have magnitude relation as: Image≧tile≧sub-band≧precinct≧code block.

Figure 16:
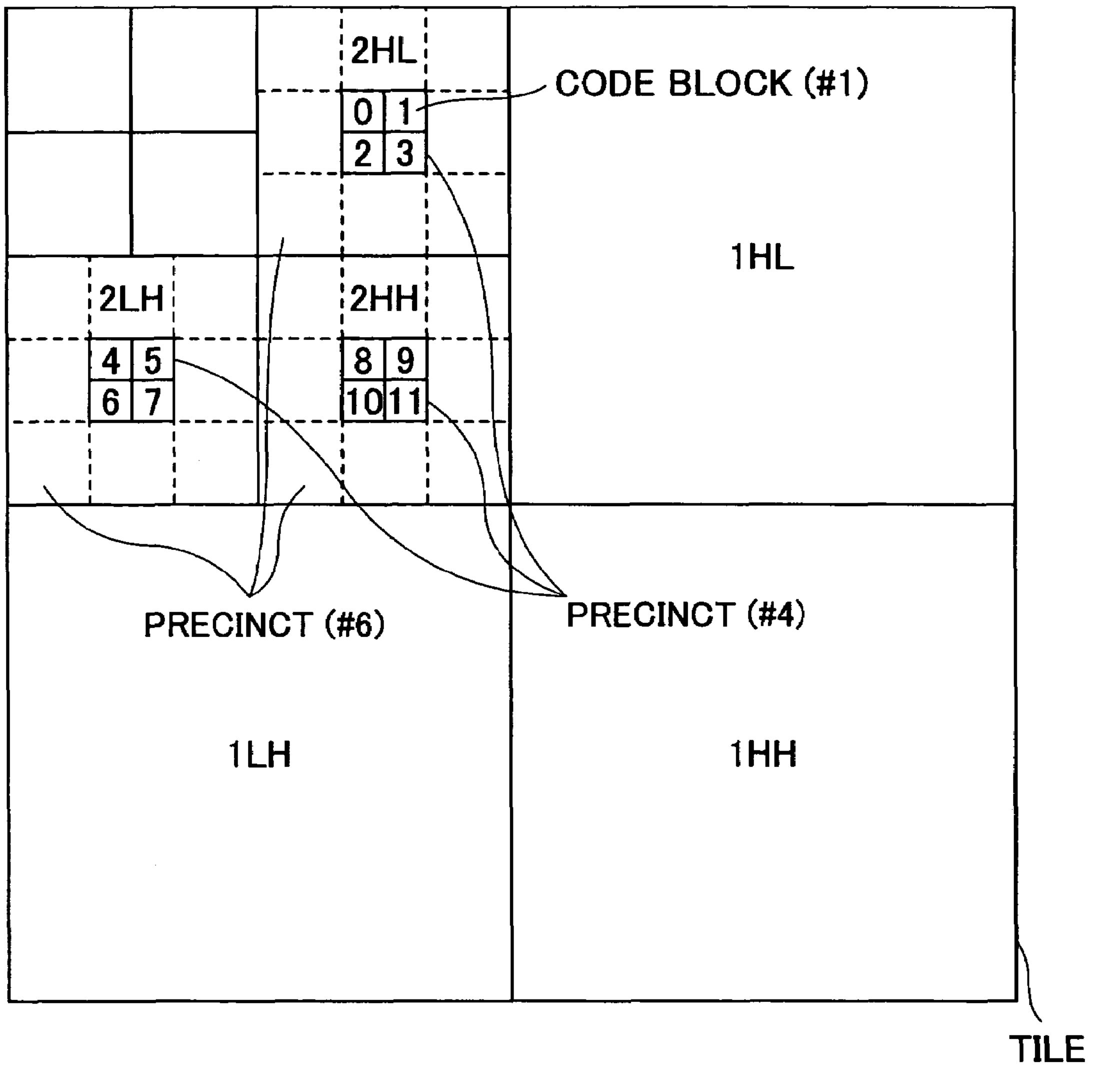
FIG. 16 is an illustrative drawing showing an example of precincts and code blocks at the decomposition level 2.

The precinct relates to rectangular areas within sub-bands. A set of three areas located at the same relative position in the respective HL, LH, and HH sub-areas at the same decomposition level is treated as a single precinct. In the LL sub-band, however, a single area is treated as a single precinct. The size of a precinct can be set equal to the size of a sub-band. As previously described, a precinct is divided into rectangular areas called code blocks. FIG. 16 is an illustrative drawing showing an example of precincts and code blocks at the decomposition level 2. In FIG. 16, a set of three areas located at the same relative position is treated as a single precinct.

A portion of all the codes of code blocks contained in a precinct (e.g., codes of three bit-planes from the highest-order bit-plane to the third bit-plane) may be selected and combined together to form a packet. There may be a packet that has no code therein. The codes of code blocks are combined to generate packets, which are then arranged in a desired progression order to generate a bit stream as shown in FIG. 15.

If packets are combined with respect to all the precincts (i.e., all the code blocks and all the sub-bands), a portion of the codes of the entire image (e.g., the codes of the highest-order bit-plane through the third bit-plane of the wavelet coefficients corresponding to the entire image) is obtained. This is called a layer (it should be noted that the layer does not have to include all the packets for all the precincts). The larger the number of layers that are decoded at the time of decompression, the better the quality of a reproduced image is. That is, a layer defines the unit of image quality. If all the layers are combined, the codes of all the bit-planes for the whole image are obtained.

FIG. 17 is an illustrative drawing showing an example of packets and layers in the case where tile division is not performed, with the number of comports being 1 the number of decomposition levels being 2 (the level of resolution being 3). Small rectangles longer in the vertical direction represent packets, and numbers inside the packets are packet numbers assigned for the sake of convenience. In FIG. 17, layers are represented by rectangle areas that are longer in the horizontal direction and that are shown in half-tones. In this example, layer 0 is comprised of the codes of packets having packet numbers 0 through 16, layer 1 comprised of the codes of packets having packet numbers 17 through 33, layer 2 comprised of the codes of packets having packet numbers 34 through 50, layer 3 comprised of the codes of packets having packet numbers 51 through 67, layer 4 comprised of the codes of packets having packet numbers 68 through 84, layer 5 comprised of the codes of packets having packet numbers 85 through 101, layer 6 comprised of the codes of packets having packet numbers 102 through 118, layer 7 comprised of the codes of packets having packet numbers 119 through 135, layer 8 comprised of the codes of packets having packet numbers 136 through 148, and layer 9 comprised of the codes of the remaining packets having packet numbers 149 through 161. That is, division into 9 layers is illustrated. This layer structure is simply an example as the relationships between the packets and the precincts change in various ways depending on the progression orders, the number of layer divisions, etc.

As can be understood from the above description, packets that constitute coded data of JPEG2000 are provided according to the parameters including resolution, color components, position, and image quality. Thus, the selection and disposal of codes can be made by using the resolution, color components, position, and image quality parameters. Namely, given coded data can be converted into different coded data without an intervening decompression process, the conversion being reflective of a change in the position (tile, precinct, code block), the image quality (layer, bit-plane, sub-bit-plane, frequency components), color components (Y, Cr, Cb components, R, G, B components, etc), and the resolution (resolution level, decomposition level).

Further, JPEG2000 is provided with a function to improve the image quality of a region of interest (ROI) better than that of other regions. According to the basic specs of JPEG2000, the "Max Shift" method is defined that performs a bit shift of wavelet coefficients in the ROI area. Information about the ROI area is provided as a description contained in the main header or tile-part header of the coded data.

At the time of decoding (decompression), image data is generated from the code stream of each tile of each component in an opposite order to the time of coding. In this case, the tag processing unit 5 interprets the tag information attached to the code stream that is supplied from an exterior, and divides the code stream into that of each tile of each component. Decoding is performed separately on the code stream of each tile of each component. The position of a bit to be decoded is determined in a sequence that is responsive to the tag information contained in the code stream. The quantization and dequantization unit 3 generates contexts based on the arrangement of surrounding bits (already decoded) that are situated around the bit to be decoded. The entropy coding and decoding unit 4 performs decoding based on the contexts and the code stream through probability estimation, thereby generating the decoded bit and writing the generated bit at the position of the bit of interest.

Coefficients of each sub-band decoded in this manner are dequantized by the quantization and dequantization unit 3 if quantization has been carried out at the time of coding. The two-dimensional wavelet transform and inverse transform unit 2 then applies the two-dimensional inverse wavelet transform in order to reconstruct the data of each tile of each component. The reconstructed data is subjected to inverse color conversion by the color conversion and inverse color conversion unit 1 if color-space conversion has been performed at the time of coding. Data in the original color system is thus obtained.

In the following, an embodiment of the present invention will be described.

One embodiment of the present invention is implemented as a program that is executed by a general-purpose computer such as a personal computer, a personal digital assistant having an image-display function, and a microcomputer installed in information processing equipment such as a mobile phone.

Such an embodiment will be described by taking a computer shown in FIG. 1 as an example. The computer of FIG. 1 illustrates a general construction, and includes a CPU 100, a memory 102, a display device 104, a secondary storage device 106 such as a hard-disk drive, an input device 108 such as a keyboard and pointing device, a communication interface 110, an external interface 112, and a memory medium drive 114 for reading/writing of various memory media (e.g., a magnetic disc, an optical disc, a magneto-optical disc, a semiconductor memory device), which are connected with each other through a system bus 116.

A program 120 (hereinafter referred to as an image processing program) for practicing the invention is read by the memory medium drive 114 from a record medium, and is stored in the secondary storage device 106. Alternatively, the image processing program 120 is acquired by the communication interface 110 from the network, and is stored in the secondary storage device 106. The image processing program 120 is then loaded to the memory 102 from the secondary storage device 106 for execution by the CPU 100. This achieves the image processing apparatus or the image processing method on the computer according to one embodiment of the present invention. In the case of personal digital assistants or the like, the image processing program 120 may be provided in a ROM, and such construction is also intended to be part of the invention. It should be noted that the present invention also includes the image processing program 120, various record media (including a semiconductor memory device such as a ROM) having the program embodied therein, and an image processing apparatus implemented as a computer executing the image processing program 120.

Coded data such as still images or moving pictures to be processed may be provided through the communication interface 110 from a server on the network, may be acquired from a memory device or by an image input apparatus such as a digital camera connected to the input/output interface 112, or may be provided from the secondary storage device 106.

According to a typical embodiment of the invention, the image processing program 120 may run in association with a program 122 called a viewer or browser (hereinafter referred to as a viewer/browser) for reviewing still images or moving pictures. The viewer/browser 122 and the image processing program 120 may as well be integrated. Embodiments of the present invention also includes such an integrated program, a memory medium having such a program recorded thereon, and an image processing system implemented on a computer based on such a program.

Figure 2:
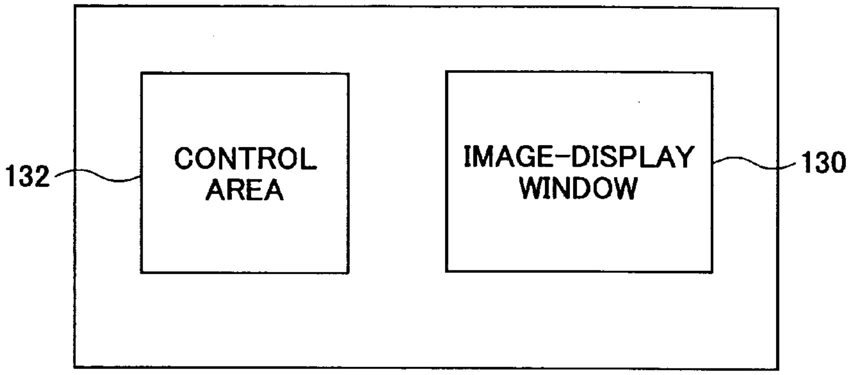
FIG. 2 is an illustrative drawing showing the screen of a display device.

The viewer/browser 122 opens an image-display window 130 on the screen of the display device 104 as illustrated in FIG. 2. The viewer/browser 122 presents moving pictures or still images in the image-display window 130, and, also, presents buttons and slide bards in a control area 132 for allowing a user to enter various instructions. Typically, the images to be displayed are selectable (by use of a file name or a URL). Further, the manipulation of a pointing device such as a mouse of the user input device 108 makes it possible to change the vertical/horizontal size of the image-display window 130, to change the enlargement ratio of images to be displayed, to scroll an image larger than the image-display window 130, to select a specific area (position), etc. The vertical/horizontal size of the image-display window 130, a display enlargement ratio, the position of an image portion, etc., are reported to the image processing program 120. The use of buttons and slide bars provided in the control area 132 makes it possible to specify various conditions regarding moving pictures or still images. Examples of such conditions include:

- an indication of a frame rate for the reproduction of moving pictures;
- an indication of a code amount that is selected for decoding or code conversion;
- an indication of a processing time for decoding or code conversion;
- a forced ending of decoding or code conversion;
- an indication of either color reproduction or monochrome reproduction;
- an indication of image quality;
- an indication of priority with respect to resolution, image quality and color; and
- an indication of priority for a region of importance (a ROI area).

If not specified by a user, any one of the above is set to a default value.

The viewer/browser 122 notifies the image processing program 120 of the above-noted conditions regarding resolution, image quality, color components, position, a region of importance, a frame rate, a code amount, a processing time, etc.

The image processing program 120 selectively decodes coded data of still images or moving pictures to generate image data in accordance with various requirements such as the decoding capability of the viewer/browser 122 and the size of the image-display window. User preference regarding the still images and moving pictures are also taken into consideration. The generated image data are then presented on the image-display window 130 by the viewer/browser 122. In this manner, the selective decoding of codes of coded data is performed by the image processing program 120 whereas the control of displaying of images on the screen of the display device 104 is taken care of by the viewer/browser 122.

Alternatively, the image processing program 120 converts original coded data into different coded data comprised of only selected codes, rather than decoding the original coded data. When such code conversion is performed, the decoding of coded data after conversion is performed by the viewer/browser 122 or some other program (or hardware-based decoder). In the case of code conversion, the selection of codes is controlled according to the requirements of a decoding capability, the size of an image-display window, etc., and also by taking into account user preference regarding the way the still images or moving pictures are presented.

Figure 3:
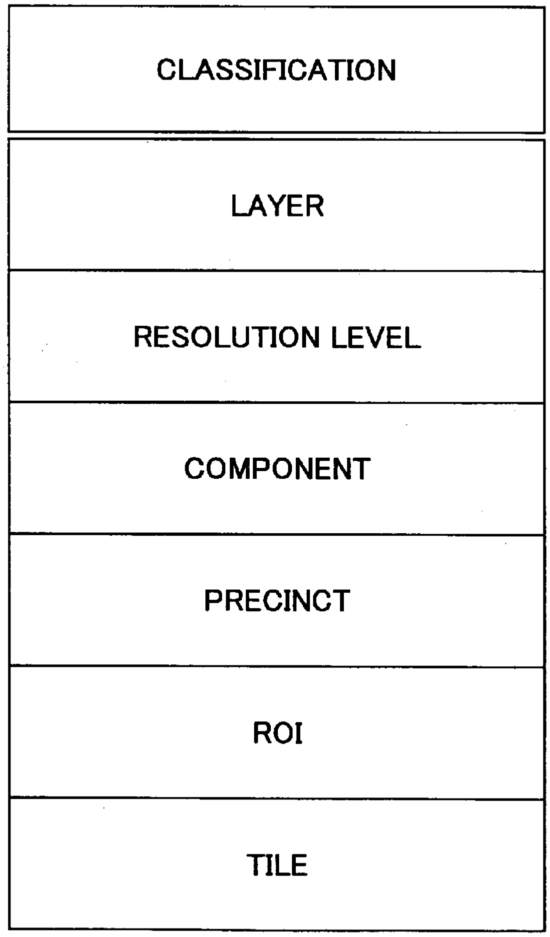
FIG. 3 is a diagram showing an example of classification and parameters.

Regardless of decoding or code conversion, the image processing program 120 generates a code selecting list for selecting codes from original coded data on a moving-picture-frame-specific basis or on a still-image-specific basis. Codes contained in the coded data can be classified according to at least one of the parameters indicative of resolution, image quality, color components, position, and a region of interest. For example, codes may be classified by use of parameters such as a layer number or the number of layers (image quality), the number of bit-planes or the number of sub-bit-planes (image quality), frequency components (image quality), a resolution level or a decomposition level (resolution), a component number (color component), a tile number (position), a precinct number (position), a code block number (position), an indication of a ROI area (region of importance), etc. FIG. 3 is a diagram showing an example of such a classification and parameters. The code selecting list is a list of classifications regarding codes that are desired to be selected.

The sequence of classifications on the code selecting list is such that the earlier the selection of a code, the closer to the top of the code selecting list the classification of such code is. This is, codes are selected in the order in which the classifications are arranged in the code selecting list. On the other hand, the order of classifications on the code selecting list is arbitrary if codes are selected independently of the order of classifications in the code selecting list. As will be described later, however, modification may be made to the list in order to delete classifications that are arranged at later positions in the code selecting list. In such a case, the classifications of codes should be arranged in such a manner that the decoding of an image does not encounter a trouble even if such modification to the list is made. This also applies in the case where classifications are arranged in the order in which codes are selected.

FIG. 4 through FIG. 7 are illustrative drawings showing examples of a code selecting list. In these examples, for the sake of simplification, only a layer number, a resolutions level, a component number, and a precinct number are shown as classification parameters. It should be noted that parameters regarding a tile or a ROI area are also employed for classification if the control of code selection gives priority to codes of a particular tile or priority to codes of the ROI area.

In the code selecting list of FIG. 5, the classifications of codes are arranged in such an order that selecting codes in the order of classifications from the top of the list achieves decoding that gives priority to resolution (i.e., achieves high resolution at early stages). In the code selecting list of FIG. 6, the classifications of codes are arranged in such an order that selecting codes in the order of classifications from the top of the list achieves decoding that gives priority to colors (i.e., achieves the reproduction of colors at early stages). In the code selecting list of FIG. 7, the classifications of codes are arranged in such an order that selecting codes in the order of classifications from the top of the list achieves decoding that gives priority to resolution until the resolution level 1, followed by giving priority to image quality, and then giving priority to resolution again.

The image processing program 120 generates the code selecting list as described above by taking into account various requirements reported from the viewer/browser 122 and the decoding capability of the image processing program or the decoding capability of the viewer/browser 122 or other program (or hardware-based decoder). Codes that match the classifications on the code selecting list are selected from the coded data of a still image or a moving-picture frame. As previously described, such selection of codes may be made in the order of codes in the coded data, or may be made in the order of classifications in the code selecting list.

In the following, a more detailed processing flow will be described.

Figure 8:
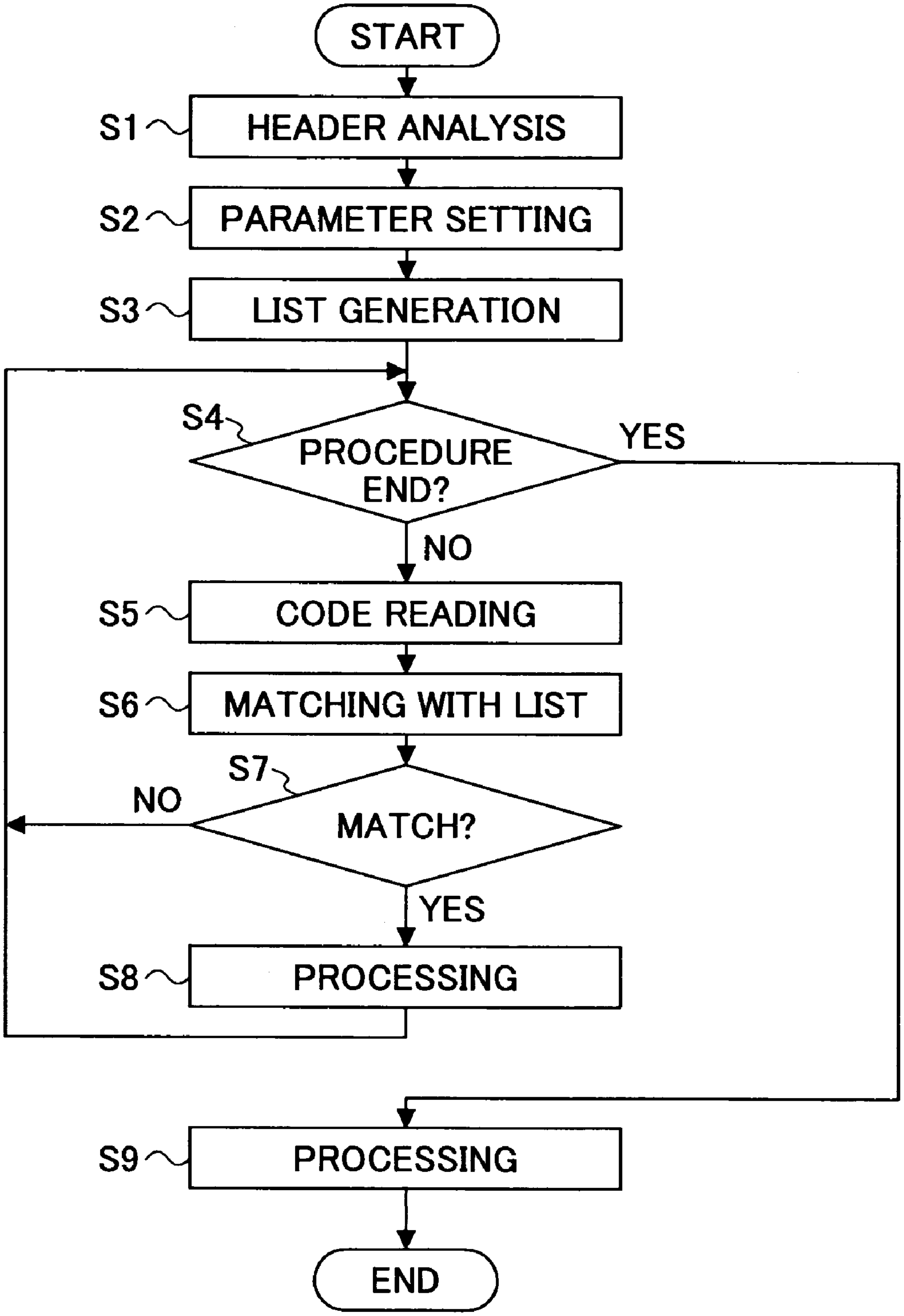
FIG. 8 is a flowchart showing an outline of a process of an image processing program performed with respect to each still image or each frame of moving pictures according to an embodiment.

FIG. 8 is a flowchart showing an outline of a process of the image processing program 120 performed with respect to each still image or each frame of moving pictures according to an embodiment. It should be noted that processing at step S8 and processing at step S9 differ between the case of decoding and the case of code conversion. In the case of decoding, a first half of the decoding process is performed at step S8, and a second half of the decoding process is carried out at step S9 based on the processing results of the first half. The first half of the decoding process includes the entropy decoding of codes and the dequantization of decoded wavelet coefficients, and the second half of the decoding process includes the inverse wavelet transform and the inverse color-space conversion, for example. Dequantization may alternatively be included in the second half. In the case of code conversion, the saving of codes and preparation for code generation are carried out at step S8, and the generation of coded data according to the JPEG2000 format is performed at step S9 by use of the saved codes.

In the following, a description will be given with reference to the processing flow. First, the main header (and the first tile-part header) of the coded data to be processed is analyzed (step S1). The second and following tile-part headers will be analyzed on as-needed basis in the course of processing. The results of header analysis will be utilized in the setting of parameters, the generation of a code selecting list, the decoding process, or the code converting process.

According to various requirements reported by the viewer/browser 122, at least one of the parameters indicative of resolution, image quality, color components, position, and a region of interest is set (step S2). If resolution is of interest, for example, the resolution level is set to 0 through 1. If image quality is of interest, layers are set to 0, 1. If color components are of interest, the components are set to 0 through 2. If the size of an image-display window is small, the resolution level is set low since the low resolution level suffices. If the size of an image-display window is large, the resolution level is set to a level suitable for the size. If priority is given to image quality, the number of layers is increased even at the expense of resolution. If a setting is made to display only a central portion of an image, codes of a particular precinct located at the central portion are given priority. Instead of a particular precinct, a tile or a tile and precinct at the central portion may be used if tile division is used. If finer control is necessary, a particular code block of a particular precinct may be used. These are examples of parameter settings.

A code selecting list as illustrated in FIG. 4, for example, is generated (step S3) for the purpose of selecting codes that satisfy the requirements of a processing time, a frame rate, etc., reported from the viewer/browser 122 and that satisfy the parameters while taking into account the decoding capability of the viewer/browser 122 (or other program or decoder).

After the preparatory processing as described above, codes in the coded data are read by the increments of packets (step S5), and the classification of a packet is compared with classifications in the code selecting list (step S6). If the classifications match (yes at step S7), this packet is selected for processing (step S8). If there is no classification match, the packet is disposed of.

Steps S5 through S8 are repeated until a check at step S4 finds the end of processing, thereby performing successive selection of packets (codes) that match the classification contained in the code selecting list. The analysis of a tile header is performed in the course of processing as described above. The presence/absence of a ROI area defined in the units of tiles may be identified based on the analysis of the main header or a tile-part header. On the other hand, the presence/absence of a ROI area defined in the units of packets may be identified by analyzing the packet header.

If all the packets including the last packet of the coded data are already processed, if all the codes that should be selected are already selected, if a user specified processing time has already passed, or if the viewer/browser 122 issues an ending request in response to an ending instruction supplied from a user, it is ascertained at step S4 that the procedure should come to an end, followed by processing at step S9. At this step S9, in the case of decoding, image data are reconstructed by using the processing results of the first half obtained with respect to the selected codes. In the case of code conversion, a code generation process is performed with respect to the selected codes, thereby generating new coded data. The generated image data or coded data are written in a particular area of the memory 102, and are displayed by the viewer/browser 122 or displayed after decoding process.

If the codes of a code block, a bit-plane, or sub-bit-plane, which is a portion of a packet, are to be selected, the codes of an unneeded code block, bit-plane, or sub-bit-plane are disposed of at step S8.

As described above, the present embodiment performs decoding or code conversion by achieving proper control of code selection according to the conditions specified by the viewer/browser 122 and the decoding capability. This makes it possible to display still images or moving pictures in such a fashion as intended by the user.

Figure 9:
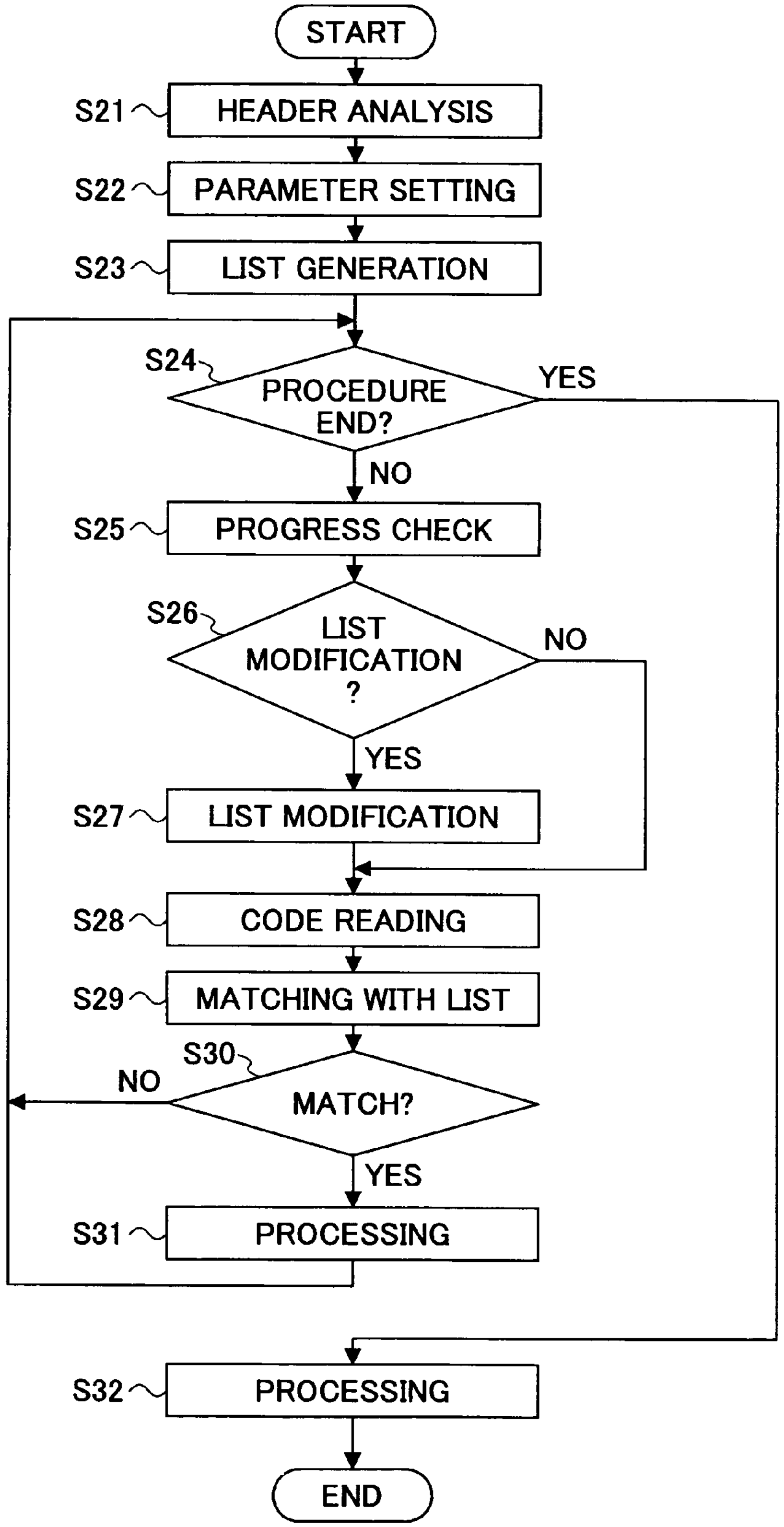
FIG. 9 is a flowchart showing an outline of a process of the image processing program performed with respect to each still image or each frame of moving pictures according to another embodiment.

FIG. 9 is a flowchart showing an outline of a process of the image processing program 120 performed with respect to each still image or each frame of moving pictures according to another embodiment.

In this flowchart, steps S21 through S24 are the same processing steps as corresponding steps S1 through S4 of FIG. 8, and a description thereof will be omitted. Further, steps S28 through S32 are the same processing steps as corresponding steps S5 through S9 of FIG. 8, and a description thereof will be omitted.

In this embodiment, a check is made as to the progress of processing (step S25). A check on the progress of processing may be made based on the amount of codes that have been processed so far (the amount of codes that have been selected so far). Alternatively, the progress of processing may be identified by checking the position of finished process on the code selecting list based on the position of codes of finished process in the coded data. Based on the progress of processing, a check is made as to whether the code selecting list needs to be modified, and as to what method of modification is to be used (step S26).

The check of progress may reveal that with the current contents of the code selecting list, the current frame rate cannot be maintained for the codes that need to be processed in order to satisfy the requirements (conditions) specified by the viewer/browser 122, or the processing of such codes cannot be completed within a specified processing time. In such a case, classifications having lower priority, i.e., classifications provided on the tail-end side of the list, are removed from the code selecting list. If there is sufficient time to spare, classifications are added to the tail end of the code selecting list (step S27). The method of determining classifications to be added may be the same as that of step S23.

Each still image or each moving-picture frame may require a varying time length for decoding process even if conditions are the same. If processing is too slow, a change in control is made so as not to select codes having lower priority. If there is sufficient time to spare, a change in control is made to select codes having lower priority for the purpose of achieving the reproduction of an image having as good quality as possible.

As can be understood from the description provided above, the present embodiment achieves proper control of code selection according to the user-specified conditions, the decoding capability, and the progress of processing. This makes it possible to display still images or moving pictures in such a fashion as intended by the user.

Figure 10:
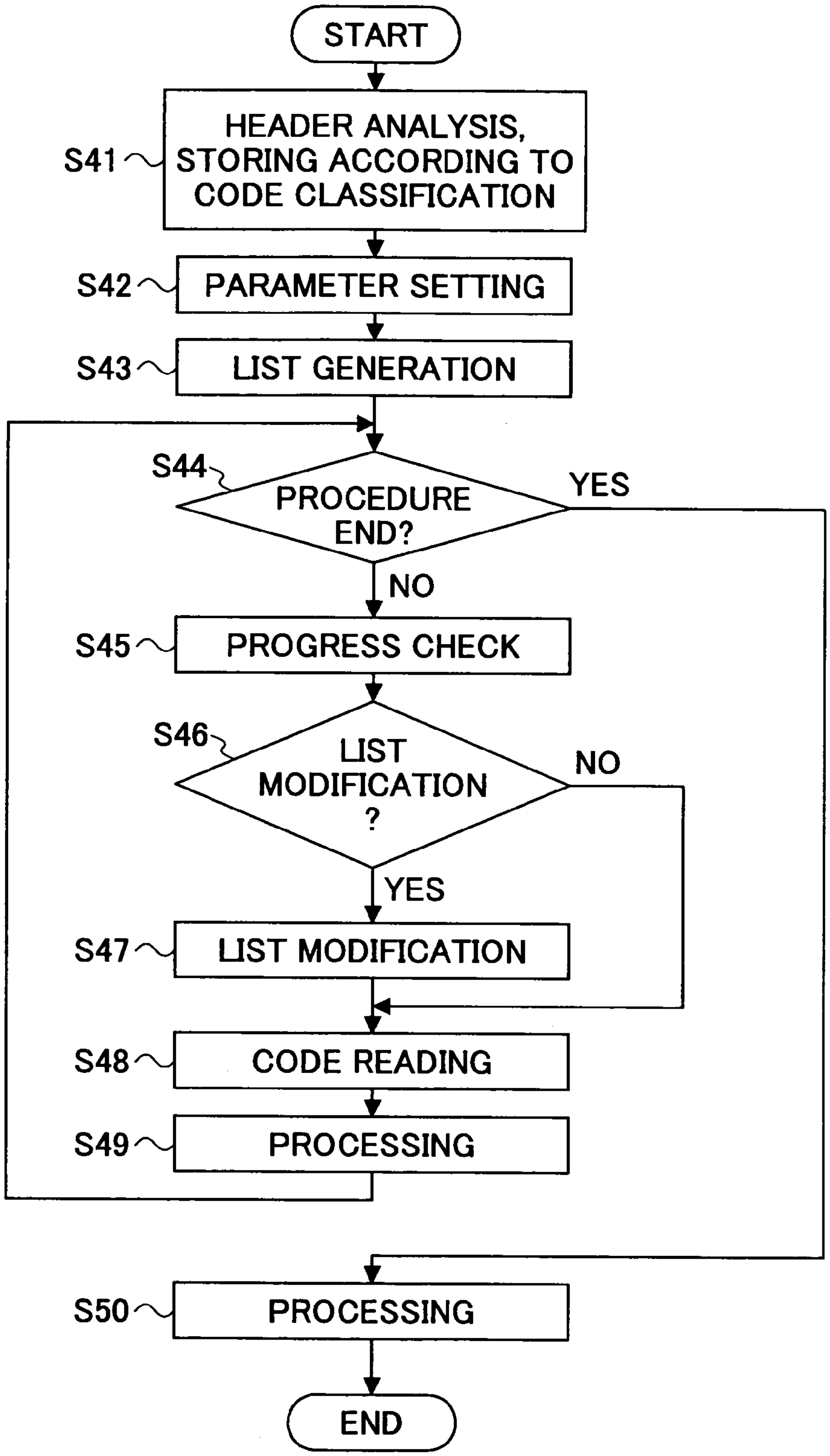
FIG. 10 is a flowchart showing an outline of a process of the image processing program performed with respect to each still image or each frame of moving pictures according to yet another embodiment.

FIG. 10 is a flowchart showing an outline of a process of the image processing program 120 performed with respect to each still image or each frame of moving pictures according to another embodiment.

In this embodiment, the entirety of coded data is read first, and, then, the main header and tile headers are analyzed, followed by storing all the codes (packets) in the memory 102 in such a manner as arranged by classification (step S41). It is thus possible to identify places where codes of desired classifications are stored. It should be noted that the results of analysis are also stored in the memory 102.

In the case of moving pictures, the process of step S42 for the next frame may be performed as a background process during the processing of the current process. Such mode of operation is also included in the present invention. In the case where a plurality of still images is successively processed, also, a background process may be performed with respect to a still image that is to be processed next.

Thereafter, parameters are set (step S42), and a code selecting list is generated (step S43). The process of step S42 is the same as that of step S2 shown in FIG. 8. The process of step S43 is the same as that of step S3 shown in FIG. 8. The code selecting list generated in step S43 has classifications of codes arranged in the order of selection. That is, if resolution is given priority, the code selecting list as shown in FIG. 5 is generated, for example. If color components are given priority, the code selecting list as shown in FIG. 6 is generated, for example.

Thereafter, the process loop of steps S44 through S49 is performed. In this process loop, codes (packets) that match classifications are successively acquired according to the order of classifications arranged in the code selecting list (step S48). The first half of a decoding process or a code conversion process is performed with respect to the acquired codes (step S49). The progress of processing is checked (step S45). Based on the progress of processing, a check is made as to whether there is a need to modify the code selecting list and as to what method of modification is to be used (step S46). In this embodiment, codes are successively selected and processed by starting with codes that match classifications provided at the top of the code selecting list. Accordingly, checking the position in the code selecting list of a classification corresponding to the code that has just been processed makes it possible to identify the progress of processing. It is also possible to check the progress of processing based on the amount of codes that have been processed (selected) up to that point. Based on the progress of processing, a check is made as to the necessity to modify the code selecting list and as to what method of modification is to be used (step S46). Necessary modification is then made to the code selecting list (step S47). The method of modification is the same as that of step S27 shown in FIG. 9.

The process loop described above is repeated until a determination to end the procedure is made at step S44. When codes corresponding to the last classification on the code selecting list are processed and finished, when all the codes of coded data are processed and finished, when a user-specified processing time has already passed, or when the viewer/browser 122 issues an ending request in response to an ending instruction issued from a user, a determination to end the procedure is made at step S44.

When a determination to end the procedure is made, the process of step S50 is performed. In the case of decoding, the process of reproducing image data is performed based on the processing results of the first half obtained for the selected codes. In the case of code conversion, the process of generating codes is performed by use of the selected codes, thereby generating new coded data. The generated image data or coded data are written in a particular area of the memory 102, and are displayed by the viewer/browser 122 or displayed after decoding process.

As described above, an embodiment of the present embodiment achieves proper control of code selection according to the user-specified conditions and the decoding capability, thereby making it possible to display still images or moving pictures in such a fashion as intended by the user. Further, an embodiment of the present embodiment offers an advantage in that the selection of codes is flexibly controlled by adaptively responding to the progress of processing. The control of processing as identified in the following is readily achieved.

(1) In the case of moving pictures, a tile at the central portion of an image is given priority in terms of the selection of codes, and these codes are processed in the early stages of processing, thereby maintaining a frame rate for the tile at the center portion while processing codes for surrounding tiles so far as time permits. Such control is also applicable to still images.

(2) In still images or moving pictures, the codes of the LL sub-band are given priority for processing, and codes are then processed for the HL sub-band, the LH sub-band, and the HH sub-band in the order named so far as time permits.

(3) In still images or moving pictures, the codes of higher-order layers or bit-planes are given priority for processing, and the codes of lower-order layers or bit-planes are subsequently processed so far as time permits.

(4) In still images or moving pictures, the codes of a ROI area are given priority and processed, and other codes are processed so far as time permits.

(5) In still images or moving pictures, the codes of luminance components are given priority and processed, and the codes of color difference components are processed so far as time permits. In the case of moving pictures, therefore, the frame rate is maintained with respect to the luminance components, but may not be maintained with respect to the color difference components as far as image reproduction is not hampered.

(6) Codes are processed in such sequence as to reproduce colors at early stages, as described in connection with the code selecting list of FIG. 6.

(7) Codes are processed in such sequence as to give priority to resolution up to a certain resolution level, followed by giving priority to image quality, and then giving priority to resolution again, as described in connection with the code selecting list of FIG. 7.

(8) Code conversion is performed according to the order of code selection conforming to the progression order of coded data. With this provision, coded data after code conversion can be reproduced according to the scheduled progressive reproduction.

Figure 11:
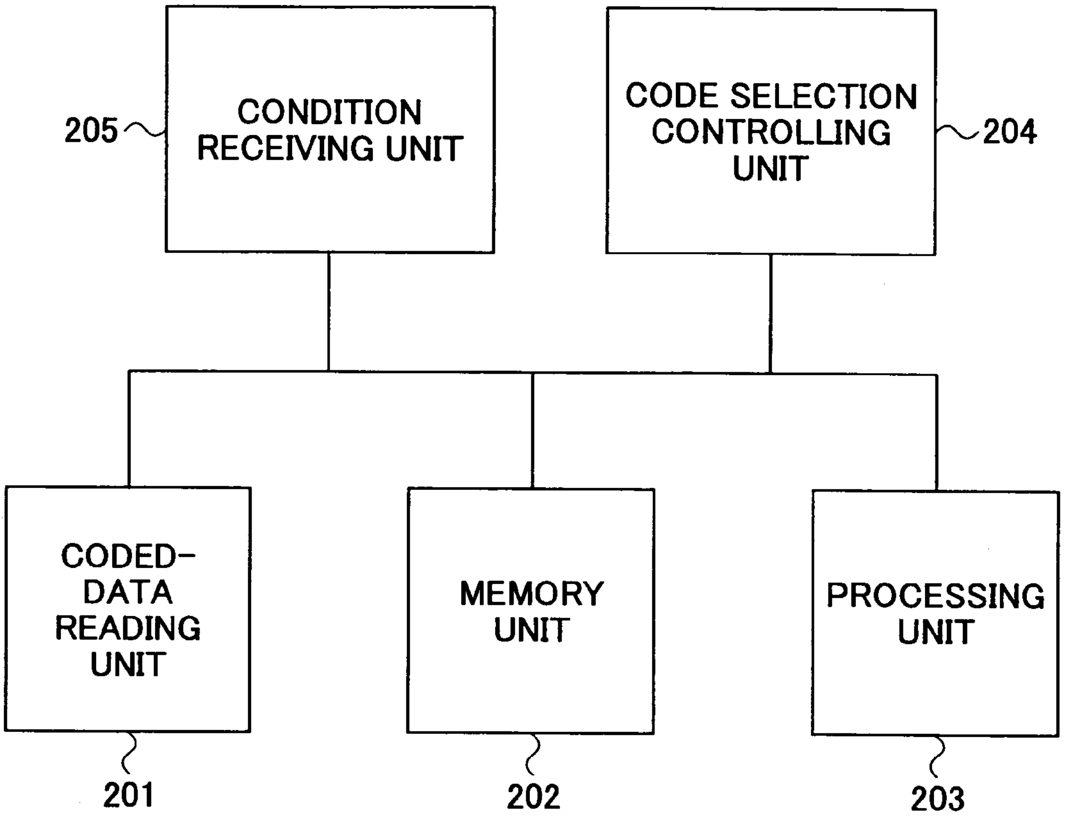
FIG. 11 is a block diagram of an image processing apparatus according to the invention.

As can be understood from the above description, the typical functional blocks of an image processing apparatus according to the invention will be illustrated as shown in FIG. 11.

In FIG. 11, a coded-data reading unit 201 reads the coded data of a still image or each moving-picture frame from a local image source or a remote image source provided on the network. A processing unit 203 performs a decoding process or a code conversion process, i.e., perform the processes of step S8, S9, S31, S32, S49, S50 of the flowchart previously described. A condition receiving unit 205 receives various conditions (requirements) specified by the viewer/browser 122. A code selection controlling unit 204 controls the selection of codes according to parameter settings, the creation and modification of a code selecting list, and the code selecting list, and also performs processing related to such control. A memory unit 202 serves as a temporal storage to store the read coded data, image data decoded by decoding process, coded data obtained after code conversion, a code selecting list, etc.

As previously described, an embodiment of the present invention includes an image processing system in which the image processing apparatus of the present invention and an image display controlling unit corresponding to the viewer/browser 122 are integrated.

An embodiment of the present invention is applicable to still images complying with JPEG2000 or to moving pictures complying with Motion-JPEG2000, and is also applicable to still images and motion pictures of other coding schemes. The control of code selection described with reference to the above embodiments may be applicable without any significant modification as long as still images or moving pictures comply with a coding scheme that performs the wavelet transform and the bit-plane-based encoding of wavelet coefficients. Discrete cosine transform (DCT) may be performed on an 8×8-pixel-block-specific basis as frequency transform, and the DCT coefficients may be divided into a plurality of frequency bands, with hierarchical coding being performed separately on each frequency band. In such a case, codes may be classified by specifying an 8×8-pixel block with a position parameter, the frequency bands of DCT coefficients with image quality parameters, etc., and the control of code selection may be applied in a similar manner, thereby making it possible to reproduce still images or moving pictures in such a manner as intended by the user.

Further, the present invention is not limited to these embodiments, but various variations and modifications may be made without departing from the scope of the present invention.

The present application is based on Japanese priority application No. 2003-307553 filed on Aug. 29, 2003, with the Japanese Patent Office, the entire contents of which are hereby incorporated by reference.

What is claimed is:

1. An image processing apparatus for processing coded data of still images or moving pictures, comprising:

a code selection controlling unit to select, from the coded data, codes that match classifications provided in a code selecting list, in which the classifications are arranged according to a priority order of at least one of resolution, image quality, color component, position, and a region of interest, wherein the priority order is different than an order of codes in the coded data such that a first code is ahead of a second code in the order of codes in the coded data while the first code is behind the second code according to the priority order; and a processing unit to process the codes selected by the code selection controlling unit, wherein the code selection controlling unit includes a unit to modify the code selecting list in response to progress of processing, and wherein the code selection controlling unit and the processing unit are executed in hardware.

2. The image processing apparatus as claimed in claim 1, wherein the processing unit decodes the codes selected by the code selection controlling unit.

3. The image processing apparatus as claimed in claim 1, wherein the processing unit converts the codes selected by the code selection controlling unit to generate another coded data.

4. The image processing apparatus as claimed in claim 1, wherein the code selecting list includes the classifications arranged in the order in which the codes are to be selected, and the code selection controlling unit selects the codes in the order.

5. The image processing apparatus as claimed in claim 1, wherein the code selection controlling unit generates the code selecting list separately for each still image or for each moving-picture frame.

6. The image processing apparatus as claimed in claim 1, wherein the code selection controlling unit stops selecting the codes in response to an end request.

7. The image processing apparatus as claimed in claim 1, wherein the code selection controlling unit includes a unit to receive conditions regarding at least one of resolution, image quality, color component, position, a region of interest, a frame rate, an amount of codes to be selected, and a processing time, to set a parameter to at least one of resolution, image quality, color component, position, a region of interest in response to the received conditions, and to generate the code selecting list responsive to the parameter.

8. The image processing apparatus as claimed in claim 7, further comprising:

an image display controlling unit to present an image processed by the image processing apparatus on a display device, wherein the image display controlling unit provides the image processing apparatus with the conditions regarding at least one of resolution, image quality, color component, position, a region of interest, a frame rate, an amount of codes to be selected, and a processing time.

9. The image processing system as claimed in claim 8, wherein the image display controlling unit includes a unit to receive a user indication indicative of the conditions regarding at least one of resolution, image quality, color component, position, a region of interest, a frame rate, an amount of codes to be selected, and a processing time.

10. The image processing apparatus as claimed in claim 1, wherein the coded data complies with JPEG2000.

11. A method of processing coded data of still images or moving pictures, comprising:

using a processor to perform the following:

selecting, from the coded data, codes that match classifications provided in a code selecting list, in which the classifications are arranged according to a priority order of at least one of resolution, image quality, color component, position, and a region of interest, wherein the priority order is different than an order of codes in the coded data such that a first code is ahead of a second code in the order of codes in the coded data while the first code is behind the second code according to the priority order; and processing the selected codes that match classifications provided in a code selecting lists, wherein the selecting codes that match includes modifying the code selecting list in response to progress of processing.

12. The method as claimed in claim 11, wherein the processing the codes comprises decoding the selected codes.

13. The method as claimed in claim 11, wherein the processing the codes comprises converting the selected codes to generate another coded data.

14. The method as claimed in claim 11, wherein the code selecting list includes the classifications arranged in the order in which the codes are to be selected, and the selecting codes that match comprises selecting the codes in the order.

15. The method as claimed in claim 11, wherein the selecting codes that match includes setting a parameter to at least one of resolution, image quality, color component, position, and a region of interest in response to specified conditions regarding at least one of resolution, image quality, color component, position, a region of interest, a frame rate, an amount of codes to be selected, and a processing time, and wherein selecting codes that match comprises generating the code selecting list responsive to the parameter.

16. The method as claimed in claim 15, wherein at least one of the conditions is specifiable by a user.

* * * * *